March 28, 1939.  A. U. GRETTER  2,152,547
CLOTHESLINE HOLDER
Filed Nov. 22, 1937
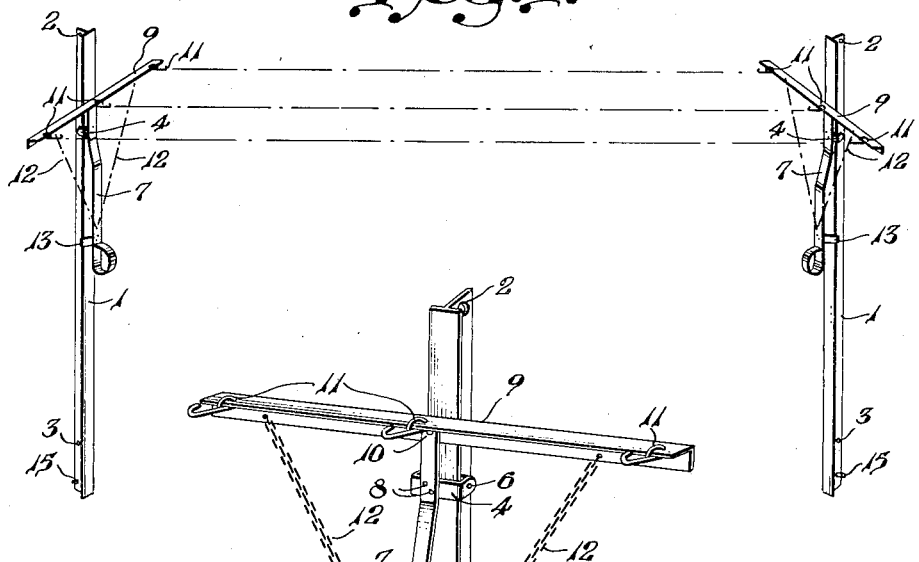
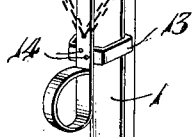
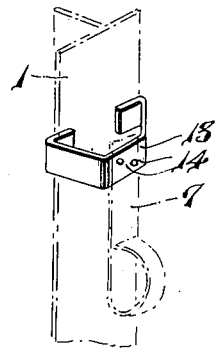
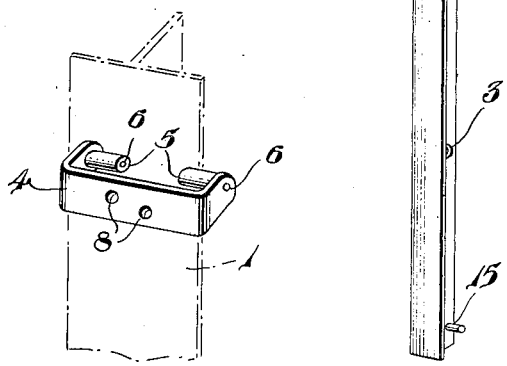
Inventor
Aloys U. Gretter Patented Mar. 28, 1939

2,152,547

UNITED STATES PATENT OFFICE 2,152,547

CLOTHESLINE HOLDER

Aloys Urban Gretter, Chicago, Ill.

Application November 22, 1937, Serial No. 175,816

1 Claim. (Cl. 211—119.17)

The invention relates to a clothesline holder on which an ordinary clothesline is looped over hooks secured to two cross bars thereby forming a multiple of lines, the cross bars with lines can be lowered to hang clothes on and raised up for clothes to dry.

One form of the invention is illustrated in the accompanying drawing in which

Figure 1 is a vertical drawing of the entire clothesline holder, the dotted lines showing ordinary clothesline, the latter not a part of the present invention.

Figure 2 is a detailed plan view of one entire section of the clothesline holder, there being two such sections identically alike.

Figure 3 is a detailed plan view of clevis 4 in perspective of main frame 1.

Figure 4 is a detailed plan view of inverted guide and catch 13 in perspective of main frame 1.

Main frame 1, Figures 1, 2, 3, 4, is a T bar, the flat side facing forward. In the upper end of frame 1 is a circular hole 2 and near the lower end of frame 1 is a circular hole 3.

When in use frame 1 is hung on hoop or by rope cord through hole 2, and held in position by cord or hook through hole 3. Clevis 4 is better shown in Figure 3 with rollers 5, 5, pivoted on inside ends by pivot bolts 6, 6. Clevis 4 is in position on frame 1, so that rollers 5, 5, contact back of flat on frame 1.

Handle 7 is secured to clevis 4 by bolts 8, 8. Cross bar 9 is secured to handle 7 by bolt 10. Cross bar 9 is secured to handle 7 at a point slightly above where handle 7 is secured to clevis 4. Hoops 11, 11, 11, (more can be used) are through holes in cross bar 9 to loop lines on. Chains 12, 12, are to hold cross bar 9 in horizontal position. Inverted guide and catch 13, better shown in Figure 4, is bolted to handle 7 by bolts 14, 14. This guide and catch 13 is in position over flat on main frame 1. Guide and catch 13 is slightly narrowed in front, this narrowed front being for the purpose of forming a catch or lock over frame 1.

When lines are drawn tight on hooks 11, 11, 11, the pull on cross bar 9 being above rollers 5, 5, it automatically locks guide and catch 13 on frame 1.

When operating, a slight horizontal pull on handle 7 releases guide and catch 13 and allows a free raising or lowering of handle 7, including cross bar 9. When the desired height is reached, a release of the handle 7 automatically locks same in position. 15 designates a peg bolt at lower end of frame 1 to act as a stop.

I claim:

In a clothesline support, an elongated T-bar provided with an aperture adjacent one end for suspension of the bar in vertical position from a hook or the like, a transverse angle bar movably mounted on said T-bar and provided with spaced line engaging means along one flange thereof, an elongated handle rigidly secured at one end to the intermediate portion of the transverse angle bar and provided adjacent said one end with a clevis having a pair of rollers engageable with the rear of the face of the T-bar, a combination guide and catch means secured to the handle adjacent its other end, said transverse bar being movable along said T-bar upon manipulation of the handle and being adapted to be secured in selective positions along the T-bar when said handle is released.

ALOYS U. GRETTER.